March 27, 1934. L. O. BEARD 1,952,965
MEASURING INSTRUMENT
Filed July 29, 1932
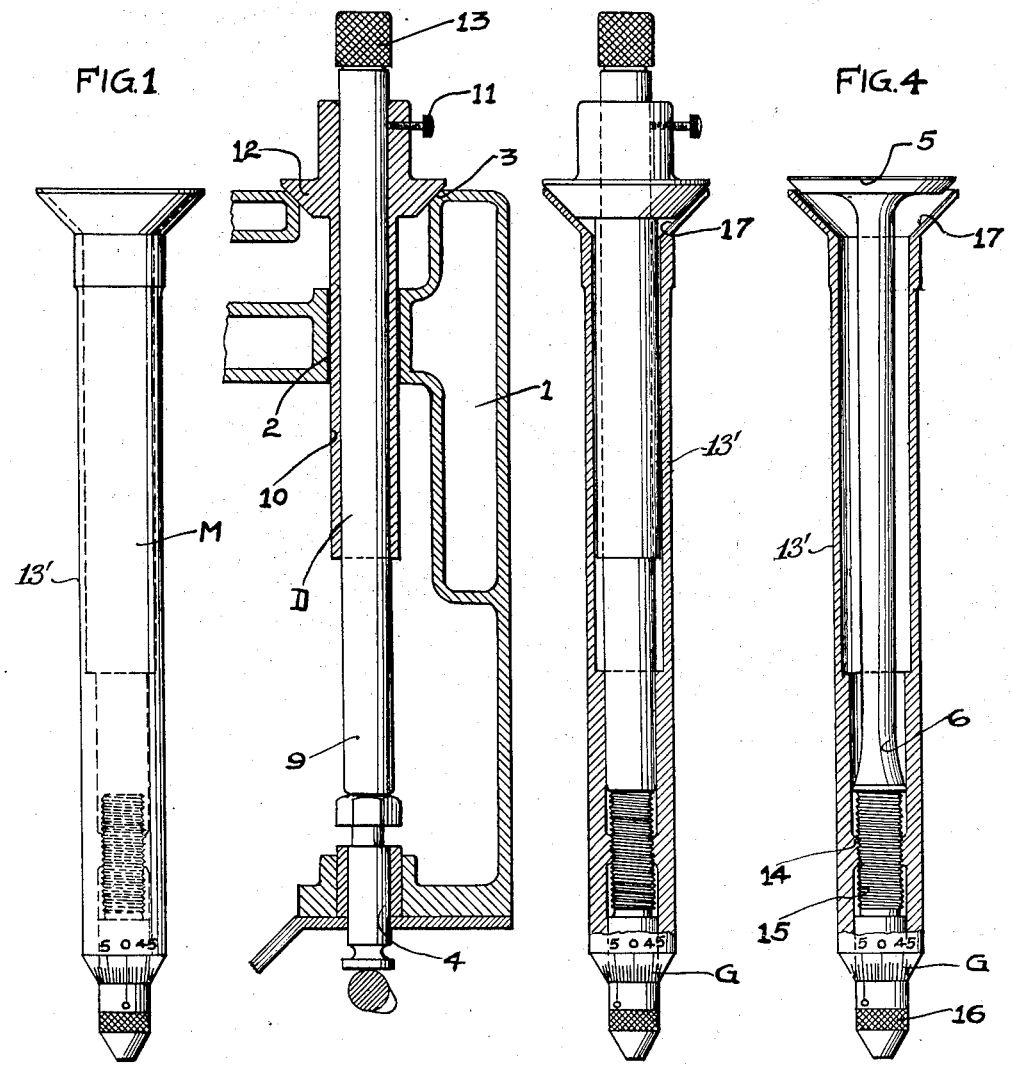

Patented Mar. 27, 1934

1,952,965

UNITED STATES PATENT OFFICE 1,952,965

MEASURING INSTRUMENT

Lawrence O. Beard, Lancaster, Pa.

Application July 29, 1932, Serial No. 625,918

2 Claims. (Cl. 33—181)

This invention relates to measuring instruments for use in measuring the length of tappet valves of internal combustion engines during grinding operations incident to the servicing of worn valves and valve seats, and for measuring the distance between the seats for such valves and the actuating tappet therefor.

Heretofore it has been the practice to reinsert the valve within the valve guide of the engine after grinding to determine approximately how much stock must be removed from the end of the valve stem in order to compensate for the increased distance or clearance which exists between the valve and its seat as a result of the grinding operations.

The lower end of the valve is then ground, and the operation just described is repeated to determine whether the valve stem engages the tappet and the valve is tightly seated when in closed position. This can only be accomplished after repeating the steps described several times, and even after an accurate seating length of valve has been obtained it becomes necessary to again insert the valve in the valve guide of the engine for the purpose of determining how much further the stem must be shortened to provide the customary clearance of from ten to twelve thousandths of an inch between the valve and its seat. While a thickness gauge is generally inserted in this last operation between the end of the valve and the tappet, such gauges often become dirty, acquire kinks or otherwise become inaccurate, with the result that generally two or three measurements are required before an accurate valve assembly can be made. Furthermore it is awkward to insert a thickness gauge between the valve stem and the tappet.

One of the objects of the present invention is to provide means whereby the aforesaid calculations and adjustments can be made with a maximum of accuracy and minimum of time and labor.

Other and more specific objects and advantages will be apparent as the specification is considered in connection with the accompanying drawing, in which:

Figure 1 is a side view of a micrometer gauge embodying my invention;

Figure 2 is a side view partly in section of the depth gauge employed for measuring the distance from the valve seat to the tappet;

Figure 3 is a sectional view showing the depth gauge positioned within the micrometer gauge; and Figure 4 is a longitudinal sectional view showing the tappet valve to be ground, positioned within the micrometer gauge.

Referring more particularly to the drawing 1 denotes the cylinder block of an internal combustion engine having the valve stem opening or guide 2, valve seat 3 and tappet 4. The head of tappet valve 5 seats upon the valve seat 3 and the lower end of the stem 6 of this valve terminates just short of the tappet 4, it being desirable that there be a clearance of from ten to twelve thousandths of an inch between these parts. The valves 5 and seats 3 frequently become worn, pitted or coated with carbon, thus necessitating grinding of both valves and seats. This operation tends to disturb the normal and rather narrow range of adjustments permissible between valve 5, and the valve actuating tappet 4, thus making it necessary to reduce the length of the valve stem by grinding the lower end thereof.

Calculations incident to the aforesaid operations are accomplished according to the present invention by the use of a micrometer gauge member M and depth gauge member D. The depth gauge comprises a spindle portion 9 on which a sleeve portion 10 is slidably and rotatably mounted, a set screw 11 being employed to lock the sleeve in any desired adjusted position. The upper end of sleeve 10 is formed with a beveled valve like enlargement 12 which is adapted to snugly engage the valve seat 3 for tappet valve 5, when the depth gauge is inserted in valve guide opening 2. For convenience in handling, the spindle is formed with a knurled head 13.

In practice, assuming that valve 5 and valve seat 3 have been ground, the workman then measures the distance between valve seat 3 and tappet 4 by dropping depth gauge member D in the valve guide opening 2 of engine cylinder 1. When the lower end of spindle 9 rests upon tappet 4, sleeve 10 is then adjusted until the valve like portion 12 snugly engages tappet valve seat 3, in which position the parts are locked by means of set screw 11. The distance thus measured represents the length of valve and stem required plus the clearance between valve stem and tappet.

The micrometer gauge M comprises a sleeve 13' internally threaded as at 14 to receive the threaded end 15 of a rotatable spindle 16. After the distance between ground valve seat and tappet has been determined and the depth gauge set accordingly, the latter is inserted within the sleeve 13' of the micrometer gauge. When the end of spindle 9 of the depth gauge engages the upper end of threaded portion 15 of spindle 16, and valve like portion 12 seats upon the beveled valve seat portion 17 of the micrometer gauge, the graduations G will indicate the required length of tappet valve, plus clearance.

The operator having taken the reading of gauge M now replaces the depth gauge with the tappet valve 5, as illustrated in Figure 4 of the drawing and rotates spindle 16 in an appropriate direction until the valve engages seat 17. A further reading is now taken and the result obtained by subtracting one from the other will indicate the amount of stock which must be removed from the end of valve stem 6 in order that the latter will be just the right length to engage tappet 4 with the valve properly seated. If the operator will add from ten to twelve thousandths of an inch for clearance to his final figures, he will know exactly how much material must be ground from the end of stem 6.

Having thus described my invention, what I claim is:

1. A tool of the character described comprising a sleeve member internally threaded at one end, a threaded spindle extended into and threadedly connected with said end of said sleeve member, said sleeve having its other end outwardly flared to form a seat for a tappet valve and said spindle including an end portion outside of said sleeve for rotating said spindle and adjusting the spindle with respect to the sleeve member, and means on said spindle and sleeve for indicating the extent of said adjustment.

2. A tool of the character described comprising a sleeve member internally threaded at one end, a threaded spindle, threadedly connected with said one end of said sleeve member and having one end extending outside of the sleeve, said sleeve member having its other end shaped to form a tappet valve seat, means on the end portion of said spindle which extends from the sleeve for rotating the spindle with respect to the sleeve, said spindle abutting with its inner end the end of a tappet valve stem when the valve of said stem is seated on said valve seat, and means on said sleeve and said spindle for indicating the length of said valve.

LAWRENCE O. BEARD.